United States Patent [19]

Cook et al.

[11] 4,440,888
[45] Apr. 3, 1984

[54] FIRE RESISTANT HOT-MELT ADHESIVES CONTAINING MODIFIED POLYETHYLENE

[75] Inventors: Mary J. Cook; Kenneth W. Hyche, both of Kingsport, Tenn.

[73] Assignee: Eastman Kodak Company, Rochester, N.Y.

[21] Appl. No.: 392,485

[22] Filed: Jun. 28, 1982

[51] Int. Cl.³ .............................................. C08K 5/51
[52] U.S. Cl. .................... 524/139; 524/144; 524/145; 524/274; 524/405; 524/411; 524/412
[58] Field of Search ............... 524/139, 144, 145, 274, 524/405, 411, 412

[56] References Cited

U.S. PATENT DOCUMENTS

| | | | |
|---|---|---|---|
| 2,993,019 | 7/1961 | Snyder | 524/411 |
| 3,313,754 | 4/1967 | Logan | 524/274 |
| 3,803,067 | 4/1974 | Kehr et al. | 524/411 |
| 4,025,478 | 5/1977 | Jurreus | 524/274 |
| 4,098,848 | 7/1978 | Morris | 524/411 |
| 4,190,565 | 2/1980 | Cook et al. | 524/274 |
| 4,207,220 | 6/1980 | Godfrey | 524/274 |
| 4,234,469 | 11/1980 | Ohta et al. | 524/411 |

Primary Examiner—Joseph L. Schofer
Assistant Examiner—Bernard Lipman
Attorney, Agent, or Firm—Clyde L. Tootle; Daniel B. Reece, III

[57] ABSTRACT

The hot-melt adhesives of the present invention comprise a blend of at least one modified polyethylene resin, a tackifying resin and a combination of halogenated organic compounds and inorganic compounds containing antimony, boron or tin. These hot-melt adhesives have a novel combination of properties including excellent aging properties in combination with improved strength and low viscosity, and they are fire resistant or self-extinguishing.

9 Claims, No Drawings

FIRE RESISTANT HOT-MELT ADHESIVES CONTAINING MODIFIED POLYETHYLENE

This invention relates to fire resistant hot-melt adhesives containing modified polyethylene. One aspect of this invention concerns a fire resistant hot-melt adhesive containing modified polyethylene having a novel combination of properties. Another aspect of this invention concerns a fire resistant hot-melt adhesive containing modified polyethylene that has long term bond aging properties in combination with improved strength and non-sag properties, low viscosities, and also improved economics.

Hot-melt adhesives are widely used in industry for various applications.

Many hot-melt applications, because of the volume and economics involved, utilize a high concentration of low cost mineral fillers. These areas include hot-melt carpet backing, thermoplastic highway marking, automotive sound deadening, and caulks and sealants. Fillers such as $CaCO_3$, $TiO_3$, talc, and clay may be used in concentrations ranging from 4–70% by weight of the total composition. The mineral fillers not only provide low cost, but in some cases contribute strength, weatherability, non-sag properties, and fire retarding features.

One major problem in formulating high filler level compositions has been in achieving workable melt viscosities. As the filler level approaches or exceeds 50% by weight in many filled thermoplastics, the viscosities of the molten blends become too high to pump, roll coat, level out, or to adequately wet the substrates. Compositions based upon both low molecular weight polyethylene and ethylene-vinyl acetate copolymers exhibit this limitation. Occasionally, attempts are made to alter the rheology of the melts by the use of petroleum waxes such as paraffin or microcrystalline wax. However, this almost always results in general degradation of most physical properties. Therefore, it would be an advance in the state of the art to provide fire resistant hot-melt adhesives having a good combination of properties including low viscosity.

In accordance with the present invention we have found that a blend comprising at least one modified polyethylene resin, a tackifying resin and a combination of phosphate esters or halogenated organic compounds and inorganic compounds containing antimony, boron or tin provides a hot-melt adhesive would can be applied without solvents and has a novel combination of properties including long term bond aging, improved strength, non-sag properties and low viscosity.

The modified polyethylene has a saponification number of about 3 to 10, preferably 3–5, and is prepared by reacting polyethylene with an unsaturated polycarboxylic acid, anhydride or ester thereof by processes also well known in the art, as for example, U.S. Pat. No. 3,856,889. The polyethylene reacted with this unsaturated component can be low molecular weight or degraded polyethylene. The modified polyethylene can be used alone as the polyethylene component or blends of such modified polyethylene with unmodified polyethylene or blends of modified polyethylene and blends of more than one unmodified polyethylene can also be used.

The tackifying resins useful in the adhesive compositions of this invention can be a hydrocarbon resin such as DAC-B hydrocarbon resin prepared according to the process disclosed in U.S. Pat. No. 3,701,760 as well as other hydrocarbon resins, synthetic and natural polyterpenes, rosin esters and the like. One such suitable hydrocarbon tackifying resin is a hydrocarbon resin having a softening point of 130° C. and available commercially as Eastman Resin H-130 from Eastman Chemical Products, Inc. Other hydrocarbon tackifying resins can be prepared by the polymerization of monomers consisting primarily of olefins and diolefins and include, for example, the residual by-product monomers resulting from the manufacture of isoprene. These hydrocarbon tackifying resins typically exhibit a ring and ball softening point of from about 75° to 150° C.; an acid number of from about 0 to 2; a saponification value of less than about 1. Examples of such commercially available resins of this type are "Wingtack 95" as sold by the Goodyear Tire and Rubber Co. and the Sta-Tac and Betaprene H resins sold by the Reichhold Chemical Corp.

Also suitable resins are the rosin ester resins and the terpene polymers such as the polymeric, resinous materials including the dimers as well as higher polymers obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, terpinene, terpinolene, limonene, terpentine, a terpene cut or fraction, and various other terpenes. Particularly useful starting materials are terpene mixtures containing at least 20% $\beta$-pinene and/or limonene or dipentene (racemic limonene), and the "sulfate turpentine" obtained as a by-product in the sulfate pulping process.

The phosphate esters or halogenated organic compounds can be phosphate esters, halogenated phosphate esters, polychloro substituted organic compounds or polybromo substituted compounds. Such phosphate esters can be tricresyl phosphate, triphenyl phosphate, trioctyl phosphate and trixylenyl phosphate and the like. Such halogenated phosphate esters can be tris(-betachloroethyl) phosphate, tris(chloropropyl) phosphate, tris(dichloropropyl)phosphate, chlorinated polyphosphate, tris(2,3-dibromopropyl)phosphate and the like. Such polychloro-substituted compounds can be chlorinated paraffin waxes containing 40 to 75% by weight of chlorine, chlorinated propylene, chlorinated naphthalenes, chlorinated indenes, chlorinated polyphenyls such as chlorinated terphenyl, tetrachlorophthalic anhydride, chlorinated polyphenols such as tetrachlorinated bisphenol A, chlorinated polymers such as polyvinyl chloride, polyvinylidene chloride, chlorinated polyester resins and chlorinated rubbers and the like. Such polybromo substituted compounds can be pentabromochloro-cyclohexane, pentabromoethylbenzene, pentabromodiphenyl oxide, hexabromobiphenyl ether, hexabromocyclododecane, ethylene bis tris(2-cyanoethyl) phosphonium bromide and the like. Also, proprietary commercially available halogenated flame retardants can also be used.

The inorganic compounds containing antimony, boron or tin can, for example, be antimony trichloride, antimony tribromide, antimony trimethyl, diethyl antimony chloride, diethyl antimony bromide, antimony oxide, sodium antimonate and the like. Boron compounds can be zinc borate, barium metaborate and the like. Tin compounds can be tin tetrachloride, tin tetrabromide and the like.

The hydrocarbon resins and polyterpene tackifying resins can be used either alone or in combination. These tackifying resins can be used in amounts of about 5 percent to about 40 percent by weight of the adhesive composition, preferably about 10 to 20 percent by weight. The modified polyethylene or a blend of such modified polyethylenes can be used in amounts of 20 to 60 percent by weight in the adhesive formulation, preferably 25 to 35 percent by weight, most preferably 30 percent by weight. The combination of phosphate esters or halogenated organic compounds and inorganic compounds of antimony, boron and tin can be used in an amount of 30 to 70 percent by weight, preferably 35 to 65 percent by weight, most preferably 60 percent by weight. The combination of phosphate ester or halogenated organic compounds and inorganic compounds of antimony, boron and tin contains about 3 to 15 weight percent by the inorganic component.

The adhesives of the present invention have a particular combination of properties including low viscosity, good bond strength, good aging properties. The components of the adhesive within the above ranges provide an adhesive which has the desired properties. If the amounts of the components are modified from these ranges, the desirable combination of properties of the adhesive are affected. If the base modified polyethylene is used in an amount less than 20 percent, the adhesion properties of the adhesive are lowered. Likewise, if less than 10 percent tackifier is used the adhesion properties are lowered. If less than 5 percent of the combination of phosphate esters or halogenated organic compounds and inorganic compounds of antimony, boron or tin is used the flame retardant properties are about the same as an adhesive without these additives. More than 70 percent of such combination increases the viscosity so that the adhesive cannot be used in present adhesive applicators.

The adhesive compositions of this invention are prepared by blending together the adhesive components in the melt at a temperature of about 160° C. to about 200° C. until a homogeneous mixture is obtained. Various methods of blending materials of this type are known to the art and any method that produces a homogeneous mixture is satisfactory. These components blend easily in the melt and a heated vessel equipped with a stirrer is all that is required. For example, a Cowles Dissolver provides effective mixing for preparing these compositions. Solvents such as hexane, heptane, mineral spirits, xylene, toluene, benzene, chlorinated hydrocarbons, etc., are not needed to prepare the compositions of this invention; however, they can be used if desired.

In addition to the adhesive components, it is desirable for the adhesive compositions to contain about 0.1 percent to about 1.5 percent by weight, preferably about 0.25 percent to 1.0 percent by weight, of one or more antioxidants. Antioxidants that are effective include, for example, tris(di-t-butylphydroxybenzyl)-trimethylbenzene, alkylated bisphenol, zinc dibutyl dithiocarbamate, 4,4'-methylene bis(2,6-di-tert-butylphenol), tetrakis[methylene-3-(3',5'-di-t-butyl-4-hydroxyphenyl)propionate]methane, lauryl stearyl thiodipropionate, dilauryl 3,3'-thiodipropionate, 2,6-di-tertbutyl-p-cresol (BHT), and dilauryl thiodipropionate (DLTDP) and the like.

Additives such as nucleating agents, pigments, colorants, UV inhibitors, solvents, and the like can be added to the adhesive compositions of the present invention.

The adhesive compositions of this invention, which are essentially 100 percent solids, have a melt viscosity in the range of 2,000 to 100,000 centipoise at 177° C. preferably 2,000 to 30,000 centipoise.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

About 27.65 weight percent of low-molecular weight modified polyethylene (829.5 g.) having a saponification number of 5, a melt viscosity of 10,000 cp. at 150° C., density of 0.906 g./cc., and ring and ball softening point of 105° C.; about 6 weight percent of antimony trioxide (180 grams), about 54 weight percent 1,2,3,4,7,8,9,10,13,13,14,14-dodecachloro-1,4,4a,5,6,6-6a,7,10,10a,11,12,12a-dodecahydro-1,4:7,10-dimethanodibenzo[a,e]cyclooctene (1620 g.); about 12 weight percent hydrocarbon resin tackifier (360 g.) having a density of 1.028 g./cc. at 21° C., melt viscosity of about 1000 cp. at 190° C., and ring and ball softening point of 129° C.; 0.1 wt. % (3 g.) of tetrakis[methylene-3-(3',5'-di-t-butyl-4-hydroxy-phenyl)-propionate]methane; and 0.25 weight percent (7.5 g.) dilaurylthiodipropionate (DLTDP) are placed in a 5000 ml. round bottom resin pot fitted with a mechanical stirrer and nitrogen purge line. The system is purged with nitrogen and heated to 200° C. using a metal bath. The polymer blend is stirred for one hour after melting to insure that the blend is homogeneous. The molten adhesive has a melt viscosity at 177° C. of about 25,000 centipoise. Bonds made with this adhesive exhibit T Peel of 0.95 kg per 2.54 cm width (ASTM D1876) and Shear of 38.6 kg per 6.5 cm². The burning characteristics were self-extinguishing immediately upon removal of flame.

EXAMPLE 2

About 41.65 weight percent of low-molecular weight modified polyethylene (1250 g.) having a saponification number of 5, a melt viscosity of 10,000 cp. at 150° C., density of 0.906 g./cc., and ring and ball softening point of 105° C.; about 6 weight percent of antimony trioxide (180 grams), about 34 weight percent 1,2,3,4,7,8,9,10,13,13,14,14-dodecachloro-1,4,4a,5,6,6-a,7,10,10a,11,12,12a-dodecahydro-1,4:7,10-dimethanodibenzo[a,e]cyclooctene (1020 g.); about 18 weight percent hydrocarbon resin tackifier (540 g.) having a density of 1.028 g./cc. at 21° C., melt viscosity of about 1000 cp. at 190° C., and ring and ball softening point of 129° C.; 0.1 wt. % (3 g.) of tetrakis[methylene-3-(3',5'-di-t-butyl-4-hydroxyphenyl)-propionate]methane; and 0.25 weight percent (7.5 g.) dilaurylthiodipropionate (DLTDP) are placed in a 5000 ml. round bottom resin pot fitted with a mechanical stirrer and nitrogen purge line. The system is purged with nitrogen and heated to 200° C. using a metal bath. The polymer blend is stirred for one hour after melting to insure that the blend is homogeneous. The molten adhesive has a melt viscosity at 177° C. of about 4,500 centipoise. Bonds made with this adhesive exhibit T Peel of 1.04 kg per 2.54 cm width (ASTM D1876) and Shear of 40 kg per 6.5 cm². The burning characteristics were self-extinguishing 5 to 10 seconds after removal of flame.

EXAMPLE 3

About 69.65 weight percent low-molecular weight polyethylene (2089.5 g.) having a melt viscosity of 9,400 cp. at 150° C., density of 0.906 g./cc., and ring and ball softening point of 104° C.; 30 weight percent (900 g.)

Eastman Resin H-130 hydrocarbon resin tackifier having a density of 1.028 g./cc. at 21° C., melt viscosity of about 1000 cp. at 190° C. and ring and ball softening point of 129° C.; 0.1 wt. % of tetrakis[methylene-3-(3',5'-di-t-butyl-4-hydroxyphenyl)propionate]methane (3 grams); and 0.025 weight percent DLTDP (7.5 g) are placed in a 5000 ml. round bottom resin pot fitted with a mechanical stirrer and nitrogen purge line. The system is purged with nitrogen and heated to 200° C. using a metal bath. The polymer blend is stirred for one hour after melting to insure that the blend is homogeneous. The molten adhesive has a melt viscosity at 177° F. of about 2000 centipoise. Bonds made with this adhesive exhibit T Peel of 1.04 kg per 2.54 cm width and Shear of 38.6 kg per 6.5 cm². The burning characteristic of this adhesive was that it burns until total amount of hot-melt is consumed.

The hot-melt adhesives comprising a blend of at least one modified polyethylene resin, a tackifying resin, and the combination of a halogenated organic compound and an inorganic compound of antimony, boron or tin have a unique combination of properties for bonding substrates and also have excellent flame resistance. These flame resistant adhesives provide excellent bond strengths when applied over a broad range of substrates.

The invention has been described in detail with particular reference to certain preferred embodiments thereof, but it will be understood that variations and modifications can be effected within the spirit and scope of the invention.

We claim:

1. An adhesive composition capable of being used as a hot-melt adhesive comprising a blend of
   (a) about 20 to 60 percent by weight of at least one modified polyethylene having a saponification number of about 3 to 10 prepared by reacting polyethylene with a member selected from the group consisting of an unsaturated polycarboxylic acid, an unsaturated polycarboxylic anhydride, and an unsaturated polycarboxylic ester,
   (b) about 30 to 70 percent by weight of at least one phosphate ester or halogenated organic flame retardant compound and at least one inorganic compound of antimony, boron or tin, said inorganic compound being present in an amount of 3 to 15 weight percent of the 30 to 70 percent by weight combination, and
   (c) about 5 to 40 percent by weight of at least one tackifier resin selected from the group consisting of hydrocarbon resin, polyterpene resin and rosin ester resin.

2. An adhesive composition according to claim 1 wherein said halogenated organic compound is 1,2,3,4,7,8,9,10,13,13,14,14-dodecachloro-1,4,4a,5,6-,6a,7,10,10a,11,12,12a-dodecahydro-1,4:7,10-dimethanodibenzo[a,e]cyclooctene.

3. An adhesive composition according to claim 2 wherein said inorganic compound of antimony, boron or tin is antimony oxide.

4. An adhesive composition capable of being used as a hot-melt adhesive comprising a blend of
   (a) about 25 to 35 weight percent of at least one modified polyethylene having a saponification number of about 3 to 10 prepared by reacting polyethylene with a member selected from the group consisting of an unsaturated polycarboxylic acid, an unsaturated polycarboxylic anhydride, and an unsaturated polycarboxylic ester,
   (b) about 35 to 65 weight percent of at least one phosphate ester or halogenated organic flame retardant compound and at least one inorganic compound of antimony, boron or tin, said inorganic compound being present in an amount of 3 to 15 weight percent of the 30 to 70 percent by weight combination, and
   (c) about 10 to 20 weight percent of at least one tackifier selected from the group consisting of hydrocarbon resin, polyterpene resin, or rosin ester resin.

5. An adhesive composition according to claim 4 wherein said inorganic compound of antimony, boron or tin is antimony trioxide.

6. An adhesive composition according to claim 5 wherein said halogenated organic compound is 1,2,3,4,7,8,9,10,13,13,14,14-dodecachloro-1,4,4a,5,6-,6a,7,10,10a,11,12,12a-dodecahydro-1,4:7,10-dimethanodibenzo[a,e]cyclooctene.

7. An adhesive composition capable of being used as a hot-melt adhesive comprising a blend of
   (a) about 30 percent by weight of at least one modified polyethylene having a saponification number of about 3 to 10 prepared by reacting polyethylene with a member selected from the group consisting of an unsaturated polycarboxylate acid, an unsaturated polycarboxylic anhydride, and an unsaturated polycarboxylic ester,
   (b) about 60 percent by weight of at least one halogenated organic flame retardant compound and at least one phosphate ester or inorganic compound of antimony, boron or tin, said inorganic compound being present in an amount of 3 to 15 weight percent of the 30 to 70 percent by weight combination, and
   (c) about 10 percent by weight of at least one tackifier resin selected from the group consisting of hydrocarbon resin, polyterpene resin and rosin ester resin.

8. An adhesive composition according to claim 7 wherein said inorganic compound of antimony, boron or tin is antimony trioxide.

9. An adhesive composition according to claim 8 wherein said halogenated organic compound is 1,2,3,4,7,8,9,10,13,13,14,14-dodecachloro-1,4,4a,5,6-,6a,7,10,10a,11,12,12a-dodecahydro-1,4:7,10-dimethanodibenzo[a,e]cyclooctene.

* * * * *